US010977099B2

(12) United States Patent
Heutger et al.

(10) Patent No.: US 10,977,099 B2
(45) Date of Patent: Apr. 13, 2021

(54) INTERCHANGING REAL-TIME DATA BETWEEN PROGRAM MODULES

(71) Applicant: Phoenix Contact GmbH & Co. KG, Blomberg (DE)

(72) Inventors: Henning Heutger, Bad Pyrmont (DE); Rolf Kleinow, Bielefeld (DE); Tobias Drewes, Bad Driburg (DE); Alexander Beck, Egling an der Paar (DE); Jens Frieben, Paderborn (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 0 days.

(21) Appl. No.: 16/349,150

(22) PCT Filed: Nov. 10, 2017

(86) PCT No.: PCT/EP2017/078924
§ 371 (c)(1),
(2) Date: May 10, 2019

(87) PCT Pub. No.: WO2018/087308
PCT Pub. Date: May 17, 2018

(65) Prior Publication Data
US 2019/0272203 A1    Sep. 5, 2019

(30) Foreign Application Priority Data

Nov. 10, 2016    (LU) .......................... 93300

(51) Int. Cl.
*G06F 9/54*    (2006.01)
(52) U.S. Cl.
CPC .............. *G06F 9/544* (2013.01); *G06F 9/541* (2013.01); *G06F 9/546* (2013.01)
(58) Field of Classification Search
CPC ..................................................... G06F 9/544
(Continued)

(56) References Cited

U.S. PATENT DOCUMENTS 6,915,487 B2 *  7/2005  Costigan, Jr. ............. G06F 8/30
                                                         715/771
7,499,899 B2 *  3/2009  Siegel ..................... G06F 16/25
                                                          706/47

FOREIGN PATENT DOCUMENTS

CH    709007 A2    6/2015
EP    2456124 A1   5/2012
GB    2415806 A    1/2006

OTHER PUBLICATIONS

Peter Brittenham, "Understanding WSDL in a UDDI registry, Part 2", Sep. 1, 2001, Publisher: IBM Corporation, 20 pp.

(Continued)

*Primary Examiner* — Andy Ho
(74) *Attorney, Agent, or Firm* — Kaplan Breyer Schwarz, LLP

(57) ABSTRACT

A method for interchanging real-time data between program modules, includes providing a data storage device and storing meta information in the data storage device, wherein the meta information has at least one variable. The method also provides for at least one description file to be provided and for the data storage device to be configured with the description file. The method also includes providing at least one connector, wherein a connection can be established between program modules via the data storage device using the connector on the basis of a request in the description file, and wherein the program modules are created using identical or different programming languages and can be executed by a real-time operating system. The method also includes interchanging at least one variable between one of the program modules and the data storage device via the connector.

16 Claims, 3 Drawing Sheets

(58) Field of Classification Search
USPC .......................................................... 719/312
See application file for complete search history.

(56) References Cited

OTHER PUBLICATIONS

Peter Brittenham et al., "Understanding WSDL in a UDDI registry, Part 1", Sep 1, 2001, Publisher: IBM Corporation, 15 pp.

Francisco Javier Diez et al., "Dynamic Exception Handling Based on Web Services and OPC XML-DA", "2008 IEEE International Conference on Web Services", Publixher: IEEE Computer Society, DOI 10.1109/ICWS.2008.51, pp. 593-599.

Authorized Officers: Voye-Piccoli, Alexandra; Rakoczy, Tobias, International Search Report and Written Opinion issued in PCT application No. PCT/EP2017/078924, dated Jan. 9, 2018, 11 pp.

Office Action issued in corresponding German patent application No. 1020161215414, dated Jul. 11, 2017, 16 pp.

"Data exchange via OPC XML, SIMOTION Frequently Asked Questions", Siemens AG, dated Jul. 2007, 34 pp.

Athorized Officer: Nora Lindner, English Translation of International Preliminary Report on Patentability issued in PCT application No. PCT/EP2017/078924, dated May 23, 2019, 9 pp.

* cited by examiner

US 10,977,099 B2

INTERCHANGING REAL-TIME DATA BETWEEN PROGRAM MODULES

FIELD

The present invention is in the field of automation technology and relates to a method for interchanging real-time data between program modules. The present invention also relates to a data storage device, to a device for interchanging data between program modules, to a real-time operating system, and to a computer program product.

BACKGROUND

Current topics of interest, such as, for example, Industry 4.0, the Internet of Things or the CPS Agenda of VDI, suggest that in the future automated systems will be characterized by a large amount of interlinking and software. In the process, there will be a switch from the conventional IEC 61131-3 programming to modern high-level languages. By 2018, approximately 70% of the code will not be in languages defined according to IEC. Thus, in addition to the existing requirements such as, for example, real-time capability and consistency, there will be a demand for higher flexibility, more reliability and improved maintenance capability.

In the interlinking of sensors, the real-time capability of the overall system assumes an important role. This is particularly important in an industrial environment with time-critical processes. Therefore, all the system components of an automation system have to be improved in terms of their real-time capability. As a result of future developments, the storage devices and the program modules that access them will become of crucial importance, since there will be a trend toward processing and storing an increasing amount of data.

SUMMARY

The present invention aims to indicate a solution to improve real-time data interchange between program modules.

This aim is achieved according to the invention by the features of Claim 1. The aim is also achieved by a data storage device according to Claim 12, by a device for data interchange between program modules according to Claim 14, by a real-time operating system according to Claim 15 and by a computer program product according to Claim 16. Additional designs result from the dependent claims.

The method according to the invention for interchanging real-time data between program modules provides a data storage device and storing meta information in the data storage device, wherein the meta information has at least one variable. The method also provides at least one description file and configuring the data storage device with the description file. The method also comprises providing at least one connector, wherein a connection can be established between program modules via the data storage device using the connector on the basis of a request in the description file, and wherein the program modules are created using identical or different programming languages and can be executed by a real-time operating system. The method also comprises interchanging at least one variable between one of the program modules and the data storage device via the connector.

The data storage device comprises in particular software components, configured, for example, as part of the firmware of a control device, wherein the control device is configured in particular as a control device for controlling an automation system. For example, the control device can be used for reading in sensor data and for controlling actuators on the basis of the sensor data, wherein, for this purpose, multiple program modules are executed in the control device.

The data storage device comprises a memory by means of which the program modules can interchange data. A functionality of the data storage device, referred to as connector, provides a connection of a program module to another program module via the data storage device. Via the memory, the data storage device can provide device-local data for the interchange between the program modules and it can be used equally by all the processes.

In particular, the meta information is read in by the data storage device, and it can be associated with a respective program module, wherein the meta information can comprise in particular the identification of a variable used in the program module as well as additional information associated with this variable, such as, for example, a data type.

The description file defines the configuration of the data storage device, wherein the description file can comprise, for example, the meta information or information on meta information to be read in, for example, in the form of a file path. The description file can also comprise information which defines connectors to be created.

The description file is provided, for example, in the form of a text file in a memory of a control device and read in, for example, in the case of operation startup or switching on of the control device by the data storage device, as part of the firmware of the control device.

An input for creating a connector in the description file can be considered to be a request for creating a corresponding connector, i.e., for providing the corresponding functionality in the data storage device. For this purpose, the description file comprises, for example, information on which connection or port of a program module is to be connected to which connection or port of another program module. The connections or ports of the program modules are provided, for example, via APIs.

The description file can be considered a meta description file by means of which each connection or port with its respective data type and data direction can be specified.

The data storage device thus provides a memory or a global data space in which program module variables or variable values can be stored, so that other program modules can access them.

For this purpose, via the functionality of the data storage device, referred to as connector, between one of the program modules and the data storage device, at least one variable or variable value can be interchanged, i.e., a program module transmits to the data storage device a variable or variable value which is stored in the memory or global data space, or a program module retrieves a variable or variable value stored in the memory or global data space, wherein the communication occurs via connections of the respective program modules which are connected by a connector.

In the automation technology, a switch can be predicted from using the conventional SPS program languages to using high-level languages. Therefore, according to the invention, it is made possible to access a common data storage or data storage device in real time, even if program modules written in different program languages are used.

To date, for example, the standard IEC 61131 has governed the syntax and the semantics of program languages for programmable controllers. Here, a uniform suite of programming languages for programmable controllers is proposed. This suite comprises two text languages (instruction list and structured text) and two graphic languages (ladder diagram and function block diagram). In the standard IEC 61131 (version 3.0, 2013 February), features are also defined which are to simplify the communication between program controllers and other components of an automated system.

However, other programming languages can also be used according to the invention, which replace the current conventional programming languages according to IEC 61131 or are already used currently in parallel with these programming languages. For example, program modules can be used which are each programmed in at least one of the programming languages according to the standard IEC 61131, in Matlab/Simulink, C++, C# or JAVA or Python. Other programming languages are also possible.

Accordingly, a single programming language can be used for all the programming modules. It is also possible to use different programming languages for two or more program modules.

The program modules are controlled, for example, with the help of a programming interface, in particular an API (Application Programming Interface). The description file can be provided, for example, as an XML file (Extensible Markup Language File).

The programming interface or the API of the data storage device enables an application developer to browse the published variables with their meta information and to create connectors during runtime. In addition to a static connection via connectors, dynamic connections by connectors can thus also be created. This can be necessary for components the data access of which changes during runtime, such as, for example, an OPC-UA (Open Platform Communications Unified Architecture) server, which can provide browsing of data points at any time. For detailed analysis possibilities and error searching, the programming interface or the API in addition provides the possibility of listing all the created connectors.

The configuration of the data storage device and its connectors can occur by means of a description file or a plurality of description files, for example, in the form of an XML file or multiple XML files. These description files enable configuring instead of programming. Thus, the operation of a system during runtime can be changed, without having to newly compile application parts. The use of description files or an XML-based configuration also enables the user to carry out adaptations directly in the control or to use his own external tools or tool chains. The creation of a description file or XML file is here specified by clearly defined schema files which enable a rapid verification of the configuration.

In addition to the configuration of the data storage device, the program modules or programs and their connections or ports can also be defined with the help of description files, in particular by XML-based description files. The description files can be considered meta description files, by means of which each connection or port with its respective data type and data direction can be specified. In addition, other attributes can also be indicated, which can be used for the dynamic search in the data storage device. Examples of this are units or company-specific tags. In order to be able to implement a linking of variables of different programming domains, all the data types are advantageously defined in a common language. By means of this common language, it is possible to describe programs that use primitive, self-defined data types or data types specified by libraries. This general description language is advantageous for linking structures or individual elements of these structures.

The specification of the data storage device, the connectors and the program metadata in multiple description files or in multiple XML configuration files enables splitting an overall application into functional modules which can be created by different developer groups or providers. This facilitates not only the development of a complex system control, but also the stepwise enlargement of a running system. Thus, the overall application does not have to be available from the start, but can be composed of submodules. In this context, an overall application is understood to mean all the programs or program modules, tasks and configuration settings which are necessary for the implementation in a control device.

In this context, the terms "program" and "program module" are used interchangeably.

The description file comprises meta information. Meta information describes variables and programs indicating, for example, which variable ports provide a program and of which type they are. Ports are understood to mean variables which represent inputs or outputs of programs or components and which can thus be interconnected (in a directed manner) in that storage space in the data storage device is provided for them. Meta information describes the entire program, i.e., the sum of all the incoming and outgoing connections or ports. Meta information describes the type of the variables and how they are constructed, for example, bool, integers or complex composite data types. An example for meta information is the variable "release" of boolean type. A connector can transmit a variable, for example, from "release" to another program to the variable "go" of bit type. Here, the value of the variable is converted from boolean to bit.

The data of the variable can be written and read in a memory of the data storage device. How this occurs is described using a connector. Meta information is necessary in order to describe which variable a program provides with the help of ports. For example, a program "A" can provide the variable "release" of "boolean" type. This variable is stored in the memory of the data storage device, and the value of the variable is described by the program "A." Other programs can read out this value via a connector which knows where the variable is stored in the memory of the data storage device.

In a preferred embodiment, the method also includes providing variables in the data storage device by means of a first program module of the program modules, publishing the provided variables by means of the data storage device for at least one second program module of the program modules, and accessing the variables in the data storage device by means of at least the second program module.

Another design of the invention provides that at least one buffer mechanism for storing variables in the meta information in the data storage device is provided.

Various buffer mechanisms or storage mechanisms can be used, such as, for example, a 4-fold buffer or a single buffer for single storage. The buffer mechanism can be adapted, for example, for scaling to systems with small working memory.

In another design, the method advantageously also provides for using a programming interface in a program module, wherein the programming interface enables browsing the meta information in the data storage device.

Furthermore, by means of the method, a dynamic generation of connectors is advantageously provided.

For example, browsing the meta information enables a dynamic generation of connectors (subscription), for example, by an OPC-UA server. In this context, dynamic means that this connection is not configured by a description file but that it can instead be generated and also removed during runtime via an API of the data storage device.

Advantageously, the method also provides that the data storage device is designed to supply, in response to the description file, meta information to at least some of the program modules, in such a manner that they can be executed in different processes managed by the real-time operating system.

In another design variant of the method, it can be provided that the variables are converted from a first data type to a second data type using the connector.

Advantageously, the method can also carry out a functional operation using the connector.

Another option for the connectors is the possibility of also carrying out functional operations similar to a type conversion. Thus, for example, without additional programming, a temperature can be converted from Fahrenheit to Celsius.

In another design variant of the method, an enlargement of the data storage device by an additional program module can be provided, without a new start of a control system being carried out.

A control system denotes a sequence control in which typically program modules can be uploaded, started, debugged, stopped and downloaded. The control system is based on the real-time operating system.

It is advantageous that an enlargement of the control system is possible without having to interrupt the control system for a new start. In this manner, the operation can be continued continuously.

Furthermore, advantageously, the method provides a replacement value using the connector for the case in which no updating of a published variable occurs within a defined time interval.

In order to meet the various requirements of the programs, connectors can have different properties. Thus, the user has the possibility of selecting between different connectors which, depending on the design goals of the application, focus, for example, on real-time capability, data consistency, memory use or combinations of these properties. These connectors can in addition take over the task of providing replacement values, if programs do not update their published variables within a defined time interval.

In another advantageous design, the method comprises configuring the data storage with the description file by defining a connection, a data type for the connection, and a data direction of the connection.

Here, the term "connection" is to be considered equivalent to the term "port." The data direction of a connection can be defined as inport or as outport. The connection between an outport of a published program and an inport of a subscribing program is implemented with the help of a connector. The connector provides a plurality of functionalities. Using the connector, for example, a possible conversion between different data types from the participating program domains can be carried out. In this manner, for example, an INT from an IEC 61131-3 program can be converted in a simple manner to an int16 of a C++ program.

The data of other components such as, for example, data of fieldbus systems, can also be reproduced in the data storage device as linkable ports. This enables the user to simply connect IO (Input Output) data with the programs of different program domains. For example, in this way, the devices of a fieldbus can be represented structured as variables and named in a defined manner.

The aim of the invention is also achieved by a data storage device for data interchange between program modules of identical or different program language in a real-time operating system wherein the data storage device comprises a memory for carrying out the method according to the invention.

The data storage device is preferably configured as a global data storage device (GDS). Furthermore, the data storage device can be installed as a centrally implemented software component of a control in an automation system. Here, the data storage device can provide, via a memory, device-local data for the interchange between programs and it can be used equally by all the processes.

In a design of the data storage device, an interchange region in the memory of the data storage device is provided, in which data can be written and data can be read out, wherein program modules can access the data storage device via interfaces.

The data storage device and its connectors can support a consistent interchange of variables within a task as well as beyond task limits. The principle of the conventional IEC 6113-3 program execution is applied to the task execution. Thus, in other tasks, the input data is available to the programs in a task-consistent manner. In addition, meta information or data can be interchanged directly between the programs within a task.

The aim of invention is also achieved by a device for interchanging data between program modules of identical or different program languages in a real-time operating system. Here, the device comprises a data storage device according to the invention, at least one processor, and at least one interface for an automation device.

The invention also achieves the aim of interchanging data between program modules of identical or different program languages using a real-time operating system. Here, the real-time operating system comprises a data storage device, at least one stored description file, by means of which the data storage device can be configured, and multiple program modules which can be executed by the real-time operating system and which are created using identical or different program languages. Here, the data storage device is configured to link to one another the program modules using connectors, in order to interchange at least one variable between program modules, wherein the meta information with the at least one variable is stored in the data storage device.

The meta information with the at least one variable can be used by the connectors for the connection creation. One or more description files are also used, which can be configured, for example, as an XML file. In the case of a plurality of description files, said description files can be assembled to a configuration of an overall configuration of higher order than the description files.

The aim of the invention is also achieved by using a computer program product with program code means for carrying out the method according to the invention, wherein the computer program product runs on a computer system in a real-time operating system.

BRIEF DESCRIPTION OF THE DRAWINGS

Embodiment examples of the invention are represented purely diagrammatically in the drawings and described in further detail below. The drawings show.

DETAILED DESCRIPTION

Figure 1:
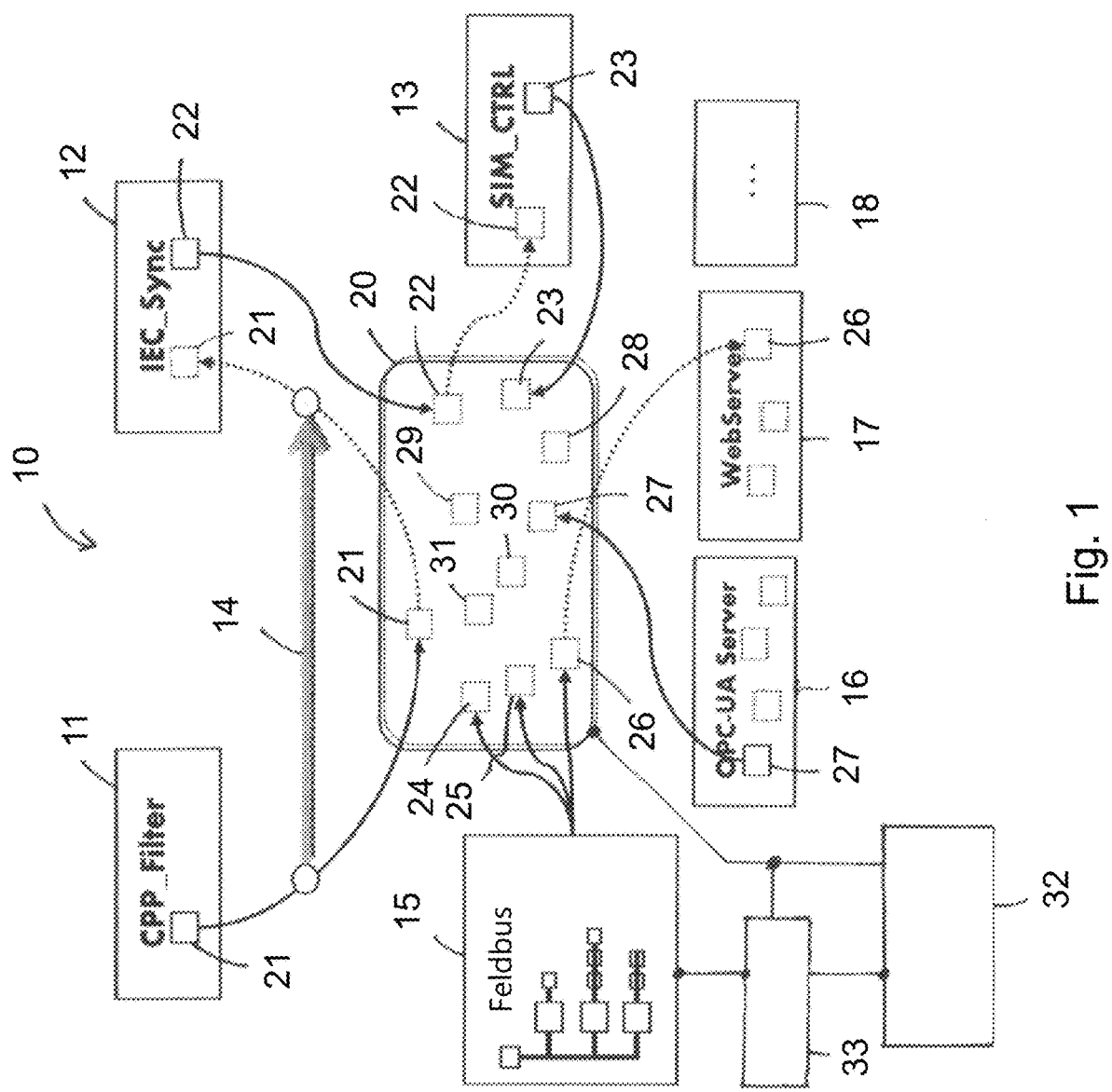
FIG. 1 an embodiment example of a device for interchanging data between program modules in a real-time operating system.

FIG. 1 shows an embodiment example of a device 10 for interchanging data between program modules 11, 12, 13 in a real-time operating system. Here, an interchange of real-time data between the program modules 11, 12, 13 is executed via a data storage device 20. The program modules 11, 12, 13 can be connected to one another with the programs CPP_Filter, IEC_Sync and SIM_CTRL via connectors for the data interchange. An example of a connector 14, which can also be referred to as "intelligent connector," is shown diagrammatically as an arrow between the program modules 11 and 12, which can also be referred to as "intelligent connector." The connector 14 represents a connection of the program module 11 to the program module 12 via the data storage device 20.

Here, in FIG. 1, the connection from the program module 11 with the CPP_Filter in the global memory 20 and then from there to the program module 12 with the IEC_Sync program is a simplified representation showing how the data can be accessed or how the data can be stored. The connector 20 defines how the data source (CPP_Filter) can write the variables/data and how the data sink (IEC_Sync) can read in said data. Here, "intelligent connector" denotes that, inter alia, information can also be indicated via conversions of the data.

In addition to the name of the variable, other meta information can also be stored additionally in the data storage device 20. This includes, inter alia, the time of the most recent modification, access rights, visibility, data type, user-defined attributes or a describing text.

In addition to the basic data types which are known from each program language, the connectors 14 can also link user-defined data types to one another, such as, for example, structures, arrays or combinations of the two. Here, a linking to the entire data type or to parts thereof can be used.

In FIG. 1, other components are also represented diagrammatically, which are implemented, for example, as software components, such as a fieldbus 15, an OPC-UA server 16, a web server 17, and any other desired components 18 of an automation in system, which access in each case data 21-31 provided in the data storage device 20 by reading or writing.

The data storage device 10 also comprises a processor 32 and an interface 33 for an automation device. In the present example, the data storage device 20 is connected to the processor 32 and also to the interface 33. The connections can be wired or wireless. In the present embodiment example, the interface 33 is also connected via a component of the fieldbus 15.

The data storage device 11 of FIG. 1 is a global memory for storing data, wherein the data 21-31 is implemented as metadata or meta information and contains at least one variable. These variables can be published in the data storage device 11 and other program modules 11, 12, 13, or components 15, 16, 17, 18 can be made available, in that they subscribe to and obtain them in real time.

Each program module 11, 12, 13, regardless of which program domain it belongs to, receives, by the use of a predetermined API, the possibility of storing variables in the data storage device 20 as global data space. Storing or publishing variables can occur by means of a static configuration at the start of the system or dynamically during runtime. Here, the variables receive a unique name, by means of which they can be searched in the data storage device 20. After the publication, the variable can be subscribed to by other program modules and thus the values thereof can be used. A published variable is defined as inport or outport depending on the reading or writing data direction.

Figure 2:
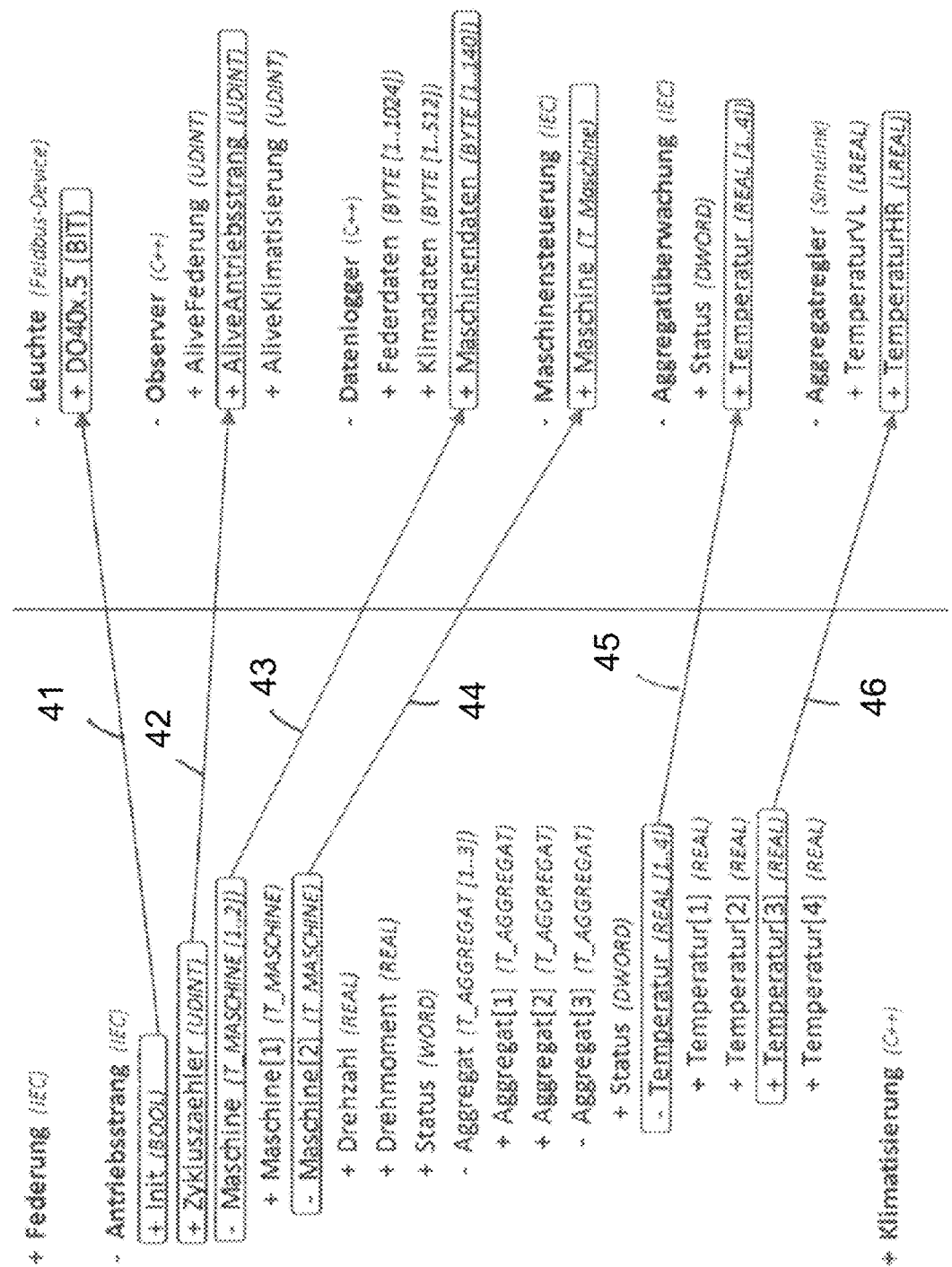
FIG. 2 an embodiment example for linking ports with different data types for the control of a machine.

FIG. 2 shows an embodiment example for linking ports with different data types for the control of a machine, in particular for the control of a drive train of the machine. Here, the connections 41 to 46 represent connectors as shown in FIG. 1. The interconnected ports in FIG. 1 are not represented in the other figures. The connector 41 shows a conversion from bool to BIT, connector 44 shows the interconnection of structures and their elements, and the connector 46 shows the interconnection of vector elements including byte swapping, scaling/offset correction and type conversion. Here, a linking can be applied to the entire data type or to parts thereof.

Figure 3:
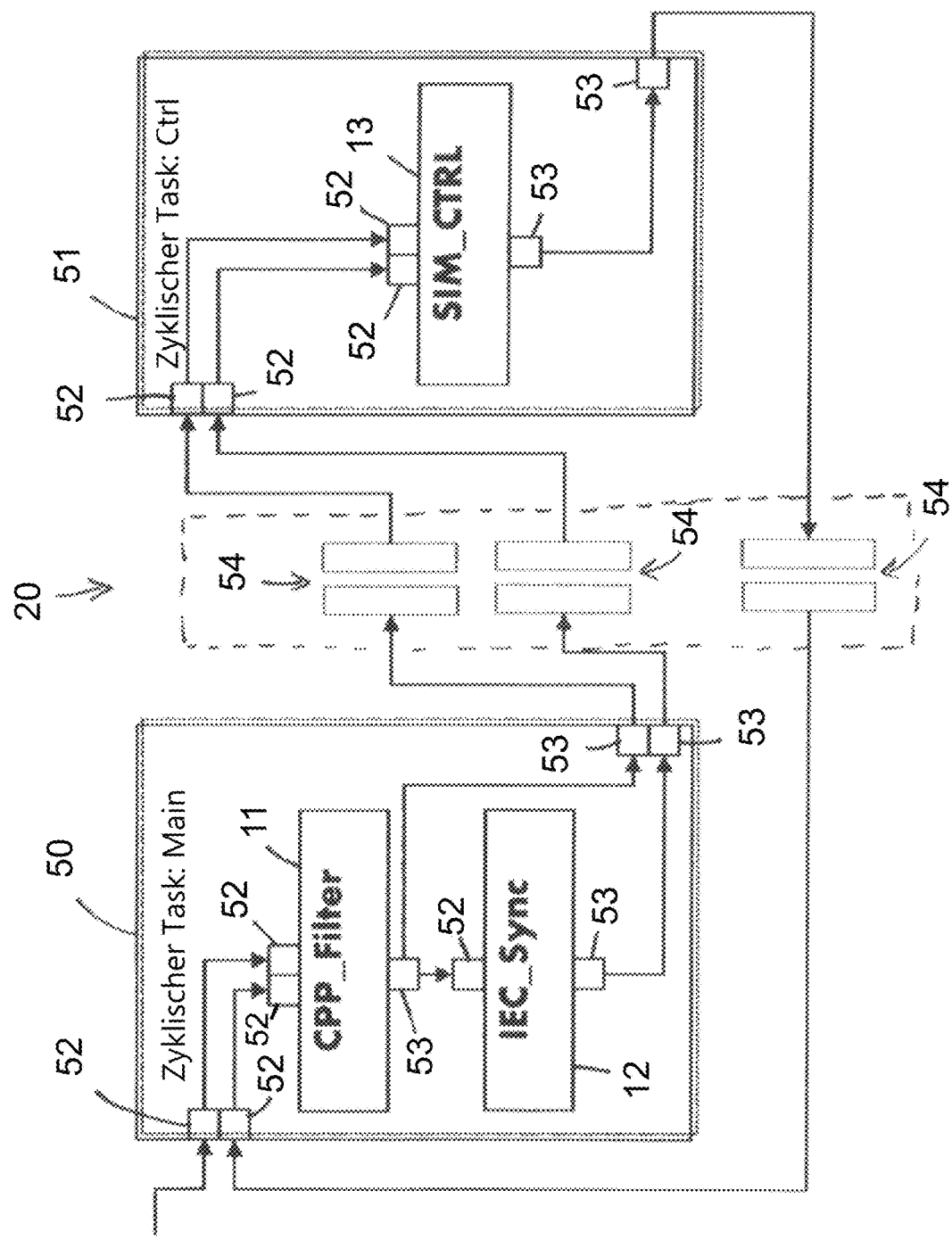
FIG. 3 an embodiment example for executing tasks with different program modules in a real-time operating system.

FIG. 3 shows an embodiment example for executing tasks 50, 51 with different program modules 11, 12, 13 in a real-time operating system. The program modules 11, 12, 13 contain their data, in particular subscribed variables, from the data storage device 20, as represented and described in FIG. 1.

FIG. 3 shows an example of a structure of tasks 50, 51, programs and connectors taking into consideration a sequence control. The task-consistent data interchange between the task 50 as main cyclic task and the task 51 as Ctrl-CyclicTask or control task is implemented by buffer mechanisms 54 of the data storage device 20. The data consistency is independent of the individual tasks 50, 51, their priority and their temporal behavior.

The first task 50 comprises the program modules 11 and 12 with the programs CPP_Filter and IEC_Sync, wherein the program languages of the program modules 11, 12 differ from one another. The second task 51 also comprises the program module 13 with the program SIM_CTRL. The program module 13 is also written in another program language in comparison to the program languages of the program modules 11, 12. Thus, all the program modules comprise another program language.

FIG. 3 shows a diagrammatic structure of connections between ports. Here, there are incoming and outgoing ports, referred to as inports 52 and outports 53, via which the input data or output data is transmitted.

The connectors are the arrows drawn in FIG. 3 within and outside of the tasks 50, 51. Here, the connectors are synchronized via buffer mechanisms 54 such as, for example, a 4-fold memory, for non-blocking and cycle-consistent data interchange between the program modules 11, 12, 13. How the data is copied at the later time to the target is defined using the connectors. An example of a connector is the entire path from the output 53 of the task 51 to the input 52 of the task 50 via the buffer mechanism 54 of the data storage device 20.

In FIG. 3, in the task 50, there is also a direct connection from the program module 11 with CPP_Filter to the program module 12 with IEC_Sync, without a path via the other represented connectors being used. This connection is not represented in FIG. 1.

Due to the provision of the data storage device 20 according to the invention as a global data storage or as a Global Data Space (GDS) and as part of a data storage device 10, a possibility is implemented for the equivalent communication between programs or program modules 11,

12, 13 of different programming domains. A real-time data interchange between program modules 11, 12, 13 or programs is possible, which can also be written in different program languages. Here, the data storage device 20 can take over the function of a data pool, which allows the linking of both primitive and complex data types of different programming languages. Here, stringent requirements in terms of the consistency of the data and the performance during the data interchange, in particular in real-time operation, are required and met. The data storage device 20 enables managing the represented data connections between programs and the meta information, which enable browsing or dynamic connecting with regard to the existing data.

Overall, according to the invention, a functionality as part of a new firmware architecture is enabled, on the basis of which new industry controls can be implemented. The architecture is designed primarily for use on a device or control device.

Here, the goal is to enhance the conventional programming of controls in order to support high-level languages. For this purpose, a soft transition is sought between the IEC 61131-3 and the high-level language world. In addition to the support of such language, the prerequisites for this also include the seamless integration of the different programming domains. This includes, inter alia, Matlab/Simulink, C++, C#, JAVA, Python and languages of IEC 61131-3. For such a seamless integration, the control should be able to apply the sequence known from the IEC 61131-3 with program instances and tasks to the sequence of the other programming domains. In spite of these more complex requirements for the technical implementation, additional aspects of data safety, usability, flexibility and above all performance capability are ensured.

Below, a possible content of a description file for the configuration of a data storage device in XML format is indicated:

```
<?xml version="1.0" encoding=utf-8"?>
<GdsConfigurationDocument>
<GdsComponentSettings>
<SharedDataSettings Size="1000000" />
<SharedMetaDataSettings Size="1000000" />
<SharedMetaConfigSettings Size="1000000" />
<MetaDataPaths>
<MetaDataPath ConfigPath="./CppCounter.meta.config" />
<MetaDataPath ConfigPath="./CppConfig.meta.config" />
<MetaDataPath ConfigFath="./PizController.meta.config" />
</MetaDataPaths>
</GdsComponentSettings>
<TaskBufferRelations>
<Task-BufferRelation Task="TaskConf" BufferType="Single"/>
<TaskBufferRelation Task="TaskMain" BufferType="Default"/>
<TaskBufferRelation Task="TaskCount' BufferType="Quad"/>
</TaskBufferRelations>
<Connections>
<Connection
StartPort="Arp.Demonstrator.CppCounter-1/CppCounter-1:Counterl6"
EndPort="Arp.Fbi.Profinet.Pnc-0/3.3:D016"
Min="" Max="" Log="True" RangeCheck="false"/>
<Connection
StartPort="Arp.Fbi.Profinet.Pnc-0/2.2:FreigabeTaster"
EndPort="Arp.Demonstrator.CppConfig-1/CppConfig-1: FreigabeTaster"
Min="" Max="" Log="True" RangeCheck="false"/>
<Connection
StartPort="Arp.Demonstrator.CppConfig-1/CppConfig-I:Freigabe"
EndPort="Arp.Fbi.Profinet.Pnc-0/2.2:FreigabeLed"
Min="" Max="" Log="True" RangeCheck="false"/>
<Connection
StartPort="Arp.Demonstrator.CppConfig-1/CppConfig-I:Freigabe"
EndPort="Arp.Demonstrator.PizController-I/PizController-1:Freigabe_Regler"
Min="" Max="" Log="True" RangeCheck="false"/>
<Connection
StartPort="Arp.Demonstrator.CppConfig-1/CppConfig-I:theta_soll"
EndPort="Arp.Demonstrator.PizController-I/PizController-1:theta_soll"
Min="" Max="" Log="True" RangeCheck="false"/>
<Connection
StartPort="Arp.Demonstrator.CppConfig-1/CppConfig-I:theta_soll"
EndPort="Arp.Demonstrator.PizController-I/PizController-1:theta_soll"
Min="" Max="" Log="True" RangeCheck="false"/>
<Connection
StartPort="Arp.Demonstrator.CppConfig-1/CppConfig-I:psi_soll"
EndPort="Arp.Demonstrator.PizController-I/PizController-1:psi_soll"
Min="" Max="" Log="True" RangeCheck="false"/>
<Connection
StartPort="Arp.Demonstrator.PizController-I/PizController-1:U_G_converted"
EndPort="Arp.Fbi.Profinet.Pnc-0/2.2:U_G_converted"
Min="" Max="" Log="True" RangeCheck="false"/>
<Connection
StartPort="Arp.Demonstrator.PizController-I/PizController-1:U_N_converted"
EndPort="Arp.Fbi.Profinet.Pnc-0/2.2:U_N_converted"
Min="" Max="" Log="True" RangeCheck="false"/>
<Connection
StartPort="Arp.Fbi.Profinet.Pnc-0/1.1:theta" EndPort="Arp.Demonstrator.PizController-
I/PizController-1:theta"
Min="" Max="" Log="True" RangeCheck="false"/>
```

-continued

```
<Connection
StartPort="Arp.Fbi.Profinet.Pnc-0/1.1:psi" EndPort="Arp.Demonstrator.PizController-
I/PizController-1:psi"
Min="" Max="" Log="True" RangeCheck="false"/>
<Connection
StartPort="Arp.Fbi.Profinet.Pnc-0/1.1:dot_theta"
EndPort="Arp.Demonstrator.PizController-I/PizController-1:dot_theta"
Min="" Max="" Log="True" RangeCheck="false"/>
<Connection
StartPort-"Arp.Fbi.Profinet.Pnc-0/1.1:dot psi"
EndPort="Arp.Demonstrator.PizController-I/PizController-1:dot_psi"
Min="" Max="" Log="True" RangeCheck="false"/>
</Connections>
</GdsConfigurationDocument>
```

Below, as an example, a possible content of a file with meta information on a program module is indicated in XML format:

```
<MetaConfigurationDocument
xmlns:td="http://www.phoenixcontact.com/schema/typedomain"
xmlns="http://www.phoenixcontact.com/schema/metaconfig"
xmlns:xsi="http://www.w3.org/2001/XMLSchema-instance"
xsi:schemaLocation="http://www.phoenixcontact.com/schema/metaconfig"
schemaVersion="1.3">
<Program
name="PizController"
version="1.0"
typeDomain="com.phoenixcontact.arp.basetypes.cpp">
<Descriptions>
<Description languageId="DE" text="Eine Programmbeschreibung"/>
<Description languageId="EN" text="A program description"/>
</Descriptions>
<!-- List of events that can be triggered by this program -->
<Events>
<Event name="ExampleEventThrownByAProgram">
<Descriptions>
<Description languageId="EN" text="An example Event that is thrown by this program"
/>
</Descriptions>
</Event>
</Events>
<Ports>
<Port name="CompPerson" type="Arp.Demonstrator.PizControllerComponent:Person"
kind="Output" multiplicity="1">
<Descriptions>
<Description languageId="DE" text=Typ wurde in Komponente definiert" />
</Descriptions>
</Port>
<Port name="FunktionsStatus" type="float"="Output" multiplicity="I">
<Descriptions>
<Description languageId="DE" text=Typ wurde in externer Typdomain definiert" />
</Descriptions>
</Port>
<Port name="theta_soll" type-"float" kind="Input" multiplicity="1">
<Attributes>
<Attribute name="Farbe" value="Rot" />
</Attributes>
<Descriptions>
<Description languageId="DE" text-"Typ gehoert zur typeDomain des Programms.
Dazu kommt noch ein Attribut." />
</Descriptions>
</Port>
<Port name="psi_soll" type="float" kind="Input" multiplicity="1" />
<Port name="theta" type="float" kind="Input" multiplicity="1" />
<Port name="psi" type="float" kind="Input" multiplicity="1" />
<Port name="dot_theta" type="float" kind=Input" multiplicity="I" />
<Port name="dot_psi" type="float" kind="Input" multiplicity="1" />
<Port name="Freigabe_Regler type="bool" kind="Input" multiplicity="1" />
<Port name="IAnteil_Aktiv" type="bool" kind="Input" multiplicity="1" />
<Port name="U_N" type="float" kind="Output" multiplicity="I" />
<Port name "U_G" type="float" kind="Output" multiplicity="I" />
<Port name="Sine" type="float" kind="Output" multiplicity="1" />
<Port name="U_G_converted" type="int16" kind="Output" multiplicity="1" />
<Port name="U_N_converted" type="int16" kind="Output" multiplicity="1" />
</Ports>
```

```
</Program>
</MetaConfigurationDocument>
```

LIST OF REFERENCE NUMERALS

10 Device
11 Program module
12 Program module
13 Program module
14 Connector
15 Fieldbus
16 OPC-UA Server
17 Data storage device
18 Component
20 Data storage device
21-31 Data
32 Processor
33 Interface
41-46 Connectors
50 Task
51 Task
52 Input or inport
53 Output or outport
54 Buffer mechanism

The invention claimed is:

1. A method for interchanging real-time data between program modules, comprising:
providing a data storage device;
storing meta information in the data storage device;
wherein the meta information has at least one variable;
providing at least one description file;
configuring the data storage device with the description file;
providing at least one connector;
wherein the connector describes how data of the variable can be written and read in a memory of the data storage device;
wherein a connection can be established between program modules via the data storage device using the connector on the basis of a request in the description file;
wherein the program modules are created using identical or different programming languages and can be executed by a real-time operating system; and
interchanging at least one variable between one of the program modules and the data storage device via the connector.

2. The method according to claim 1, further comprising:
providing variables in the data storage device by a first program module of the program modules;
publishing the provided variables by the data storage device for at least one second program module of the program modules; and
accessing the variables in the data storage device by at least one second program module.

3. The method according to claim 1, further comprising:
providing at least one buffer mechanism for storing variables in the data storage device.

4. The method according to claim 1, further comprising:
using a programming interface on a program module;
wherein the programming interface enables browsing the meta information in the data storage device.

5. The method according to claim 1, further comprising: dynamic generating of connectors.

6. The method according to claim 1, wherein the data storage device is configured to supply, in response to the description file, meta information to at least some of the program modules, in such a manner that they can be executed in different processes managed by the real-time operating system.

7. The method according to claim 1, further comprising:
converting the variables from a first data type to a second data type using the connector.

8. The method according to claim 1, further comprising:
executing a functional operation using the connector.

9. The method according to claim 1, further comprising:
enlarging the data storage device by an additional program module, without a new start of a control system being executed.

10. The method according to claim 1, further comprising:
providing a replacement value using the connector for the case in which no updating of a published variable has occurred within a published time interval.

11. The method according to claim 1, further comprising:
configuring the data storage device with the description file by defining a connection, a data type for the connection, and a data direction of the connection.

12. A data storage device for data interchange between program modules of identical or different program languages in a real-time operating system comprising a memory for carrying out the method according to claim 1.

13. The data storage device according to claim 12, comprising an interchange sector in the memory, in which data can be written and data can be read out, wherein program modules can access the data storage device via interfaces.

14. A device for interchanging data between program modules of identical or different program languages in a real-time operating system, comprising:
a data storage device according to claim 12;
at least one processor; and
at least one interface for an automation device.

15. A real-time operating system for interchanging data between program modules of identical or different program languages, comprising:
a data storage device;
at least one stored description file by means of which the data storage device can be configured; and
multiple program modules which can be executed by the real-time operating system, which are established using identical or different program languages;
wherein the data storage device is configured to connect to one another the program modules using at least one connector, in order to interchange at least one variable between program modules;
wherein the connector describes how data of the variable can be written and read in a memory of the data storage device; and
wherein the meta information is stored with the at least one variable in the data storage device.

16. A computer program product with program code means for carrying out the method according to claim 1, wherein the computer program product runs in a real-time operating system.

* * * * *